United States Patent [19]

Mazzolla

[11] 4,238,164
[45] Dec. 9, 1980

[54] POSITIVE LOCKING DEVICE FOR TELESCOPING TUBING

[75] Inventor: Richard Mazzolla, Bloomfield, N.J.

[73] Assignee: H & G Industries, Inc., Belleville, N.J.

[21] Appl. No.: 20,131

[22] Filed: Mar. 13, 1979

[51] Int. Cl.³ .............................................. F16B 7/14
[52] U.S. Cl. ...................................... 403/109; 74/531
[58] Field of Search ............... 403/109, 203, 202, 297, 403/310, 351, 352, 104, 406; 74/531

[56] References Cited

U.S. PATENT DOCUMENTS

| 2,494,878 | 1/1950 | Jensen | 403/109 X |
| 3,019,042 | 1/1962 | Smith | 403/202 |

FOREIGN PATENT DOCUMENTS 405110 2/1934 United Kingdom ..................... 403/297

Primary Examiner—Louis Rimrodt
Attorney, Agent, or Firm—Blum, Kaplan, Friedman, Silberman & Beran

[57] ABSTRACT

An externally threaded mandrel extends from one end of the inner tube of a pair of telescoping tubes and is staked thereto. A trifurcated collet threads on the mandrel whereby a conical exterior surface on the mandrel cooperates with a conical interior surface of the collet. Longitudinal ridges on the inner surface of the outer tube interlock with longitudinal grooves on the collet preventing relative motion between the outer tube and the collet while permitting longitudinal translation of the outer tube relative to the inner tube. Rotation of the inner tube in one direction advances the mandrel into the collet, with the interacting conical surfaces driving the furcate segments of the collet outward against the inner wall of the outer tube until a tight fit is produced. Friction between the collet and tube wall locks the tubes together. Reverse rotation of the inner tube withdraws the mandrel and releases the outer tube from the grip of the collet segments. The collet is made of a resilient plastic material.

8 Claims, 6 Drawing Figures

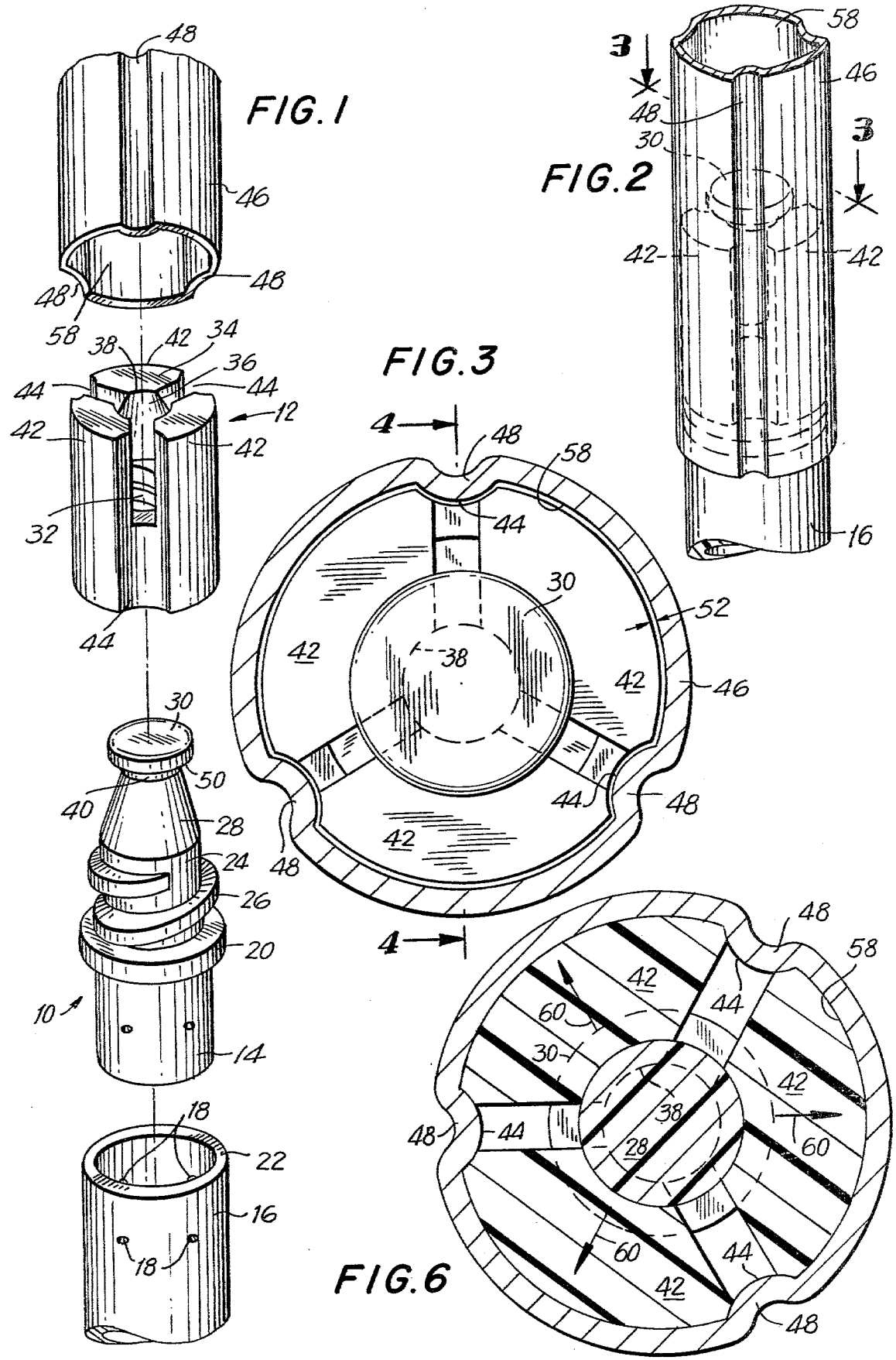

POSITIVE LOCKING DEVICE FOR TELESCOPING TUBING

BACKGROUND OF THE INVENTION

This invention relates generally to a device for locking together a pair of telescoping tubes and more particularly to a locking device which positively but releasably locks the tubes at any desired longitudinal positions. Telescoping tubes are used in many applications where a variation in length of the combined tubes is required. For example, telescoping tubes are frequently used for extension poles for paint rollers. Also telescoping tubes are used for camera tripods and table legs, to name just a few additional examples. The use of telescoping tubing in many of these applications adds to the mobility and convenience in the use of the product. However, a problem arises in holding the extended tubing at a desired length without slipping, general instability and wobbling. Slipping can be a particular problem when used with paints as wet paint can act as a lubricant.

What is needed is a positive locking device which rigidly secures a pair of telescoping tubes at any desired position and provides a solid but releasable and adjustable connection.

SUMMARY OF THE INVENTION

Generally speaking, in accordance with the invention, a positive locking device especially suited for holding the relative position between two telescoping tubes is provided. In the locking device an externally threaded mandrel extends from one end of the inner tube of a pair of telescoping tubes and is staked thereto. A trifurcated collet threads on the mandrel whereby a conical exterior surface on the mandrel cooperates with a conical interior surface of the collet. Longitudinal ridges on the inner surface of the outer tube interlock with longitudinal grooves on the collet preventing relative rotation between the outer tube and collet while permitting longitudinal translation of the outer tube relative to the inner tube. Rotation of the inner tube in one direction advances the mandrel further into the collet, with the interacting conical surfaces driving the furcate segments of the collet outward against the inner wall of the outer tube until a tight fit is produced. Friction between collet and tube wall locks the tubes together. Reverse rotation of the inner tube withdraws the mandrel and releases the outer tube from the grip of the collet segments. The collet is made of a resilient plastic material such that it is deformed by advancement of the mandrel but returns to its original condition when the mandrel is withdrawn.

Accordingly, it is the object of this invention to provide an improved positive locking device which joins together telescoping tubes at any desired relative longitudinal positions.

Another object of this invention is to provide an improved positive locking device for telescoping tubes which provide for releasable engagement between the tubes.

A still further object of this invention is to provide an improved locking device for telescoping tubes which is not visible on the outside of the telescoping tubes.

A still further object of this invention is to provide an improved positive locking device for telescoping tubing which is simple and reliable in operation.

Yet another object of this invention is to provide an improved locking device for telescoping tubing which is economical to produce.

Still other objects and advantages of the invention will in part be obvious and will in part be apparent from the specifications.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an exploded perspective view of the positive locking device of this invention in association with a pair of telescoping tubes.

FIG. 2 is a perspective view of the tubes and locking device of FIG. 1 in the telescoped condition;

FIG. 3 is a section to an enlarged scale taken along the line 3—3 of FIG. 2;

FIG. 6 is a sectional view taken along the line 6—6 of FIG. 5.

DESCRIPTION OF THE PREFERRED EMBODIMENT

Figure 4:
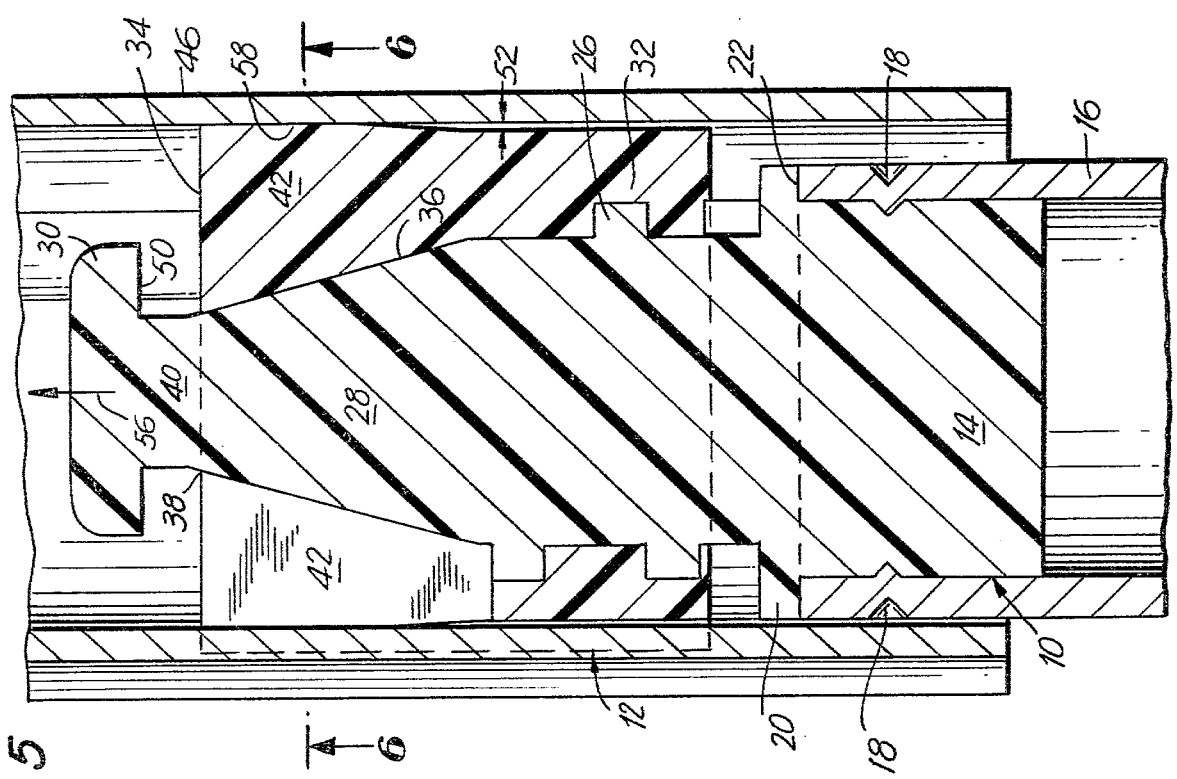
FIG. 4 is a sectional elevational view taken along the lines 4—4 of FIG. 3 and showing the locking device of this invention in the unlocked condition.
Figure 5:
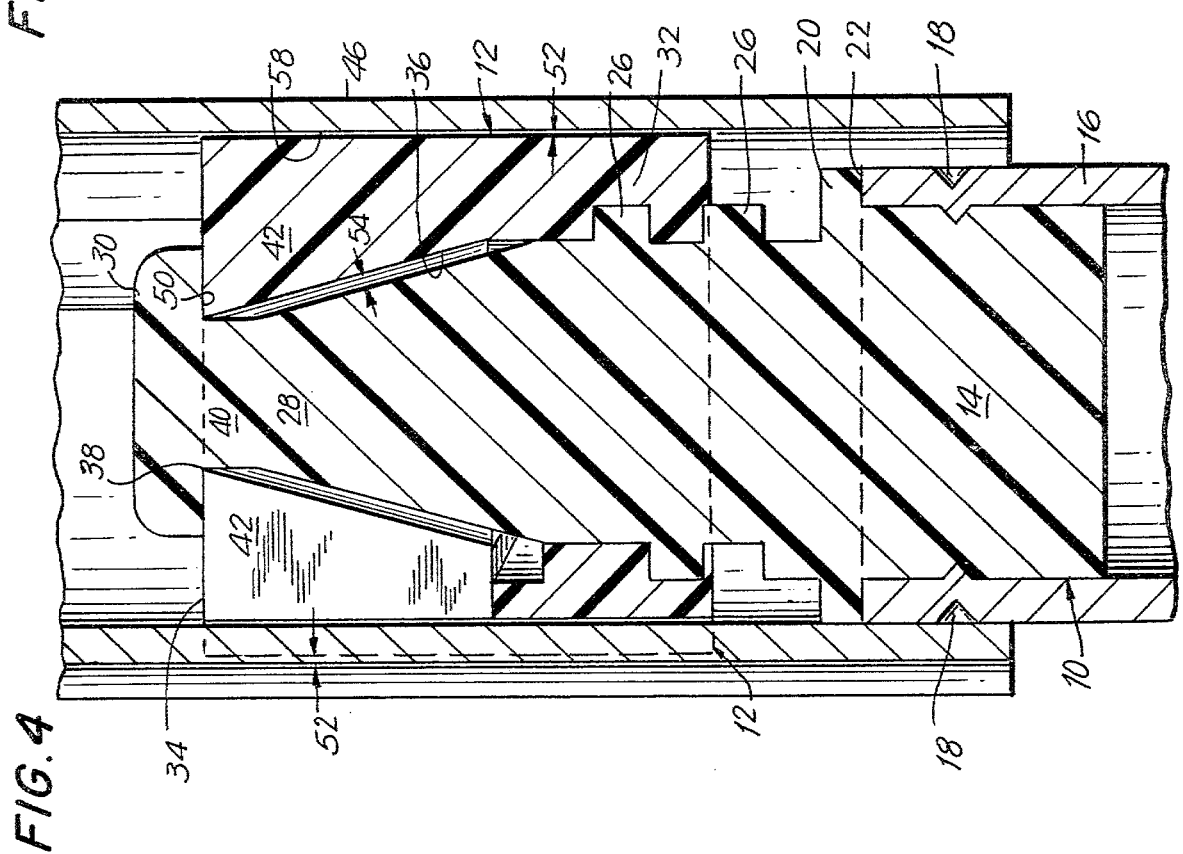
FIG. 5 is a view similar to FIG. 4 showing the positive locking device in the locked condition.

With reference to the figures, the positive locking device of this invention includes the mandrel 10 and the collet 12. The mandrel 10 comprises the smooth cylindrical shank 14 which slips inside the inner tube 16 and is locked thereto by any suitable means which do not cause a protrusion on the outer surface of the inner tube 16. Staking, as indicated by the reference numeral 18 in FIGS. 4 and 5 is an example of a means to hold the collet inside the inner tube in the prescribed manner. The staking 18 provides localized deformations in the inner tube 16 and shank 14 which prevent relative motion between the parts. The shoulder 20 on the collet 10 rests against the upper end surface 22 of the inner tube 16 and rigidizes the connection between the collet 10 and the inner tube 16 and prevents the collet 10 from slipping entirely within the tube 16.

The mandred 10 further comprises the shaft 24, having the external thread 26 spiraling therearound, and the conical segment 28 tapering away from the shank 14. The mandrel 10 further comprises the end cap 30 which provides a stop preventing the withdrawal of the mandrel 10 from the collet 12 as explained more fully hereinafter.

The collet 12 is essentially cylindrical in contour and has an opening passing longitudinally therethrough. At one end of the collet 12, the central opening is provided with internal threads 32 having a pitch and diameter suited for engagement with the external thread 26 on the mandrel 10. The central opening in the collet 12 tapers toward the other end 34 of the collet to provide an interior conical surface 36. The end 34 of the collet 12 is trifurcated in the longitudinal direction to produce three symetrically positioned branch elements 42. The branches 42 extend for approximately half the length of the collet 12. Longitudinal grooves 44 along the outer surface of the collet are symetrically spaced between the branch elements 42. The maximum outside diameter of the unstressed collet 12 provides a clearance fit within the outer tube 46 which has longitudinal ridges 48 spaced for registration with the longitudinal grooves 44 on the collet 12. The collet 12 is fabricated of resilient flexible plastic so that it may be deformed under stress and then returned to its original condition when unstressed. Nylon and polyvinylchloride are among the plastics which may be used for the collet 12.

The mandrel 10 fits within the central opening of the collet 12 with the external threads 26 of the mandrel 10 engaging the internal threads 32 of collet 12, and with the end cap 30 protruding above the other end 34 of the collet 12. The inner lip 38 on the collet 12 rides on the cylindrical surface 40 which separates the end cap 30 from the conical segment 28. Thus a longitudinal alignment is maintained between the mandrel 10 and the collet 12. It should be readily understood that the end cap 30 emerges above the end 34 of the collet 12 as the parts 10, 12 are threaded together and the flexible branch elements 42 spread apart to admit the passage of the end cap 30 therethrough. It should also be understood that in an alternative embodiment where the branch elements 42 are not sufficiently flexible, the end cap 30 may be a separate element which is attached to the remaining portion of the mandrel 10 by any suitable means, for example, a screw threading down through the end cap 30 and seating in the mandrel 10. Once joined together with the end cap 30 protruding above the end 34 of the collet 12, the lower surface 50 of the end cap 30 rests upon the end 34 of the collet 12 and prevents full retraction of the mandrel 10.

As best seen in FIGS. 3 and 4, when the collet 12 is in an unstressed condition, there is a clearance indicated by the reference numeral 52 between the collet 12 and the outer tube 46. This clearance 52 extends around the ridges 48 and the grooves 44. The outer tube 46 thus is able to freely slide in the longitudinal direction over both the collet 12 and the inner tube 16. When the collet 12 is in its unstressed condition, a clearance 54 also exists between the conical segment 28 of the mandrel 10 and the conical surface 36 of the collet 12. The assembled condition of the locking device of this invention in the telescoping tubes is also seen in FIG. 2.

When the mandrel is threaded further into the collet 12, the end cap 30 lifts off the end 34 of the collet 12 and the conical segment 28 of the mandrel 10 comes into contact with the conical surface 36 on the collet 12 as best seen in FIGS. 5 and 6. The mandrel 10 is advanced into the collet 12 by turning the inner tube 16 while the outer tube 46 is held stationary or vice versa.

Further turning of the inner tube 16 with the attached mandrel 10, causes the mandrel 10 to continue its advance in the direction indicated by the arrow 56 in FIG. 5. This causes the branch elements 42 to spread apart, as indicated by the arrows 60 (FIG. 6), under the driving force of the conical segment 28 until contact is made between the branch elements 42 and the inner wall 58 of the outer tube 46. The side clearance 52 is eliminated along a substantial portion of the length of the branch elements 42 and the inner tube 16 is turned until the resistance of the outer tubing 46 prevents further expansion of the branch elements 42. Further relative turning of the tubes is no longer possible. In this condition (FIGS. 5, 6) the relative positions between the inner tube 16 and the outer tube 46 are fixed both in the rotational direction and in the longitudinal direction. The tubes are locked together. This condition is maintained so long as the relative rotational position between the tubes 16, 46 is maintained. However, reversal in the direction of turning of the inner tube 16 relative to the outer tube 46 causes the mandrel to thread out of the collet 12 and revert to a condition shown in FIG. 4 where the collet 12 no longer engages the inner wall 58 of the outer tube 46. Thus the locking device of this invention may position the telescoped tubes 16, 46 either in a tightly locked condition or in an entirely disengaged condition or in intermediate conditions where there are varying degrees of friction against longitudinal sliding of the tubes 16, 46 relative to each other.

It should be understood that the uses of the locking devices of this invention are not limited to the application described above wherein telescoping tubes are fixed in a locked position relative to each other. The locking device of this invention may be used in an alternative embodiment as a connector between two tubes of equal diameter. The outside diameter of the collet 12 would then equal the outside diameter of the shaft 14, and when two tubes of equal diameter are connected, only the shoulder 20 need show between them. It will also be readily understood that tubes of dissimilar diameter may also be connected without the need of a telescoping arrangement between the tubes.

Further in alternative embodiments of this invention, the locking device may join tubes which are other than generally cylindrical in cross-section. For example, square and triangular pairs of tubes may be joined telescopically or not, and a round tube may be joined to a square tube, etc. In every alternative embodiment, the number and outer contour of the spreadable branch elements on the collet are adapted to press on the inner surfaces of the tube to be connected. For example, four flat-faced branch elements will be satisfactory in cooperation with a square tube. The shank of the mandrel would also be square when the second tube to be connected is square. However, the threaded and conical portions of the mandrels and collets in the alternative embodiments remains as in the embodiment described above.

It will thus be seen that the objects set forth above among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A positive locking device for releasably joining a first tube to a second tube, comprising:
    a mandrel including means for fixedly attaching said mandrel to said first tube, said mandrel having a threaded portion and a conical portion;
    a collet, said collet having a central opening therethrough, said central opening including a threaded portion and a conical portion, said mandrel being positioned inside said central opening with said threaded portion of said mandrel engaging said threaded portion of said collet, and said conical portion of said mandrel substantially opposing said conical portion of said collet;

movable means cooperating with said conical portion of said collet and adapted to fit inside said second tube, the threading of said mandrel into said collet causing said conical portion of said mandrel to contact said conical portion of said collet and drive said movable means outwardly;

means for preventing rotational motion between said collet and said movable means and said second tube when said mandrel is rotated for threading into said collet and for unthreading including longitudinal grooves on said collet engaging longitudinal ridges on said second tube, whereby when said mandrel is connected to said first tube and said movable means is within said second tube, said tubes are locked together by pressurized contact of said movable means with said second tube when said mandrel is threaded into said collet.

2. The positive locking device of claim 1 wherein said movable means is integral with said collet, and said movable means is fabricated of resilient material, whereby said movable means moves inward and said tubes are unlocked when said mandrel is unthreaded to disengage said conical portions one from the other.

3. The positive locking device of claim 1 or 2 wherein said mandrel and said collet are adapted to join generally round tubes, said mandrel and said collet being generally cylindrical in outer contour.

4. The positive locking device of claim 3 wherein said first tube is of lesser diameter than said second tube and said tubes can be slidingly telescoped when unlocked.

5. The positive locking device of claim 1 or 2 wherein said movable means includes at least two integral and movable elements operatively connected and symetrically disposed around said conical portion of said collet and moving in unison to contact said second tube when said mandrel is threaded into said collet.

6. The positive locking device of claim 5 and further comprising means for preventing said threaded portions from disengaging.

7. The positive locking device of claim 1 or 2 and further comprising means for preventing said threaded portions from disengaging.

8. A positive locking device for releasably joining a first tube to a second tube, comprising:

a collet, said collet having a central opening therein;

a mandrel including means for fixedly attaching said mandrel to said first tube and for releasably engaging said collet, said mandrel being positioned inside said central opening of said collet;

movable means cooperating with said collet and adapted to fit inside said second tube, the progressive engagement of said mandrel with said collet causing said movable means to move outwardly;

means for preventing rotational motion between said collet and said movable means and said second tube including longitudinal grooves on said collet engaging longitudinal ridges on said second tube, whereby when said mandrel is connected to said first tube and said movable means is within said second tube, said tubes are locked together by pressurized contact of said movable means with said second tube when said mandrel is engaged with said collet.

* * * * *